June 30, 1959     H. W. VAN GERPEN     2,892,311
HYDRAULIC APPARATUS
Filed Jan. 8, 1958
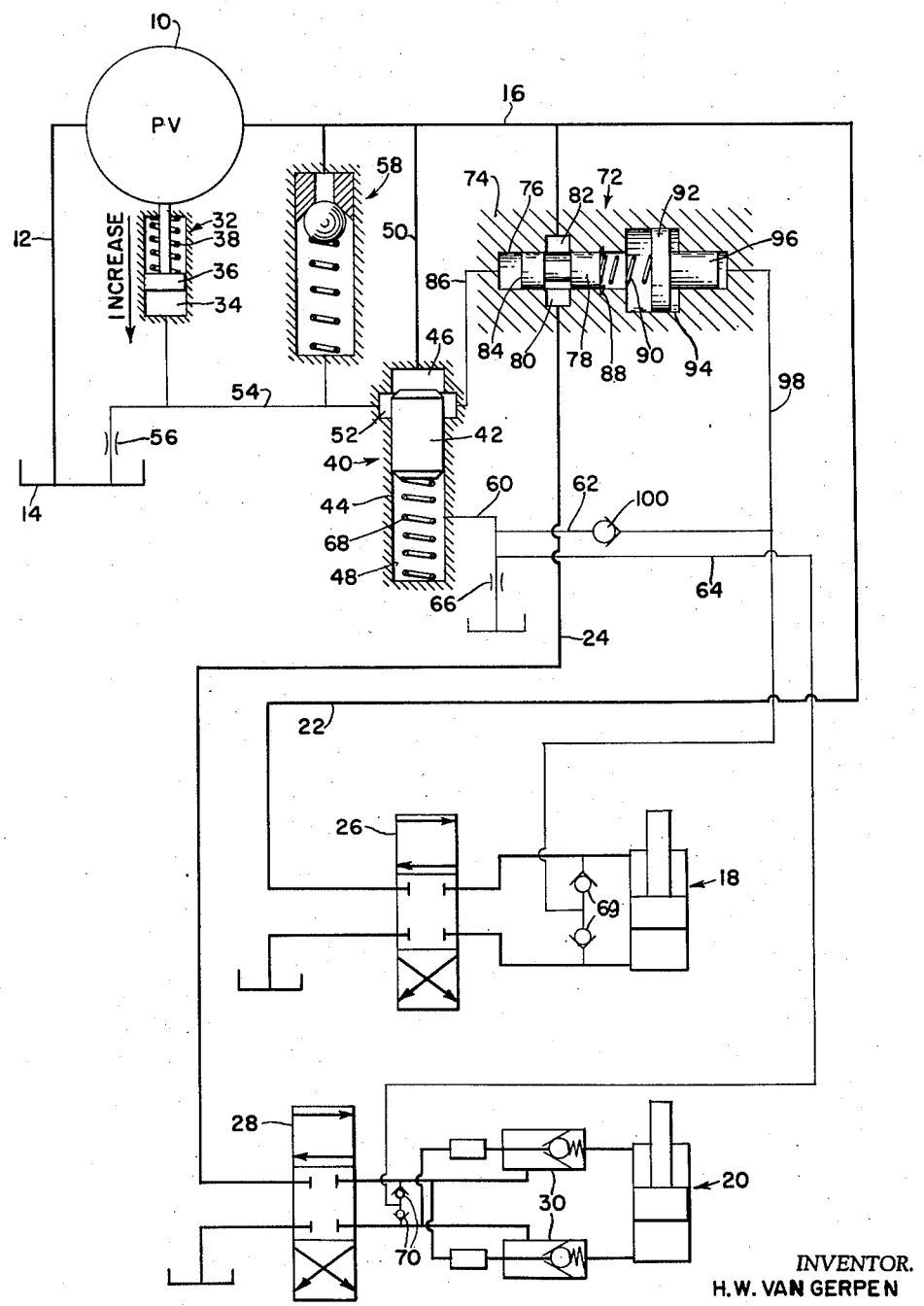
INVENTOR.
H. W. VAN GERPEN United States Patent Office 2,892,311
Patented June 30, 1959

2,892,311

HYDRAULIC APPARATUS

Harlan W. Van Gerpen, Waterloo, Iowa, assignor, by mesne assignments, to Deere & Company, a corporation of Delaware Application January 8, 1958, Serial No. 707,795

5 Claims. (Cl. 60—52)

This invention relates to a hydraulic apparatus and more particularly to a hydraulic system pressurized by a variable-displacement pump in which the system includes a plurality of motors connected in parallel to the discharge side of the pump.

In an arrangement of this character, it very often occurs that the system operates at or near pump capacity so that in the event that system demand exceeds pump capacity, one or the other of the motors will be deprived of fluid. In some situations, it is desirable that a certain motor be guaranteed full supply even though the other motor be sacrificed. One example is that in which an agricultural tractor is equipped with hydraulic power steering as well as a hydraulic cyinder for operating a rockshaft or the like for adjusting implements. Experience dictates that the steering motor should be given priority over the rockshaft cylinder.

According to the present invention, a priority valve is installed in a system of this general character so that when pump capacity is approached or exceeded the priority valve will meter or close the line to the rockshaft motor, for example, so as to assure a full supply to the steering motor, for example. It is a feature of the invention to make the priority valve operative in response to system demand so that when system demand can be satisfied by the pump both motors will be supplied in normal fashion, and wherein the line to the sacrificed motor will be metered and ultimately closed if required when pump capacity is approached or exceeded. It is a further feature of the invention to arrange the priority valve means so that it will operate to meter and close the second line just before pump capacity is reached so that there will be no instantaneous loss of capacity while the priority valve enables the system to recover in favor of the favored motor. It is another object of the invention to incorporate the control for the priority valve in a system in which a pump regulating device is operative respectively in response to increase and decrease of pressure in a control chamber for respectively decreasing and increasing pump output, and further to utilize the chamber pressure as means for actuating the priority valve in opposition to biasing means that is preloaded from a branch of a feed back circuit to which pump output is responsive.

The foregoing and other important objects and desirable features inherent in and encompassed by the invention will become apparent as a preferred embodiment thereof is disclosed in the ensuing specification and accompanying sheet of drawings wherein the single figure illustrates, partly in section, and partly schematically, a preferred apparatus and hydraulic system.

The numeral 10 represents a typical variable-displacement pump having an intake line 12 connected to reservoir at 14 and further having a discharge or high pressure line 16. The discharge line is connected to a hydraulic system which includes first and second two-way hydraulic motors 18 and 20 which are connected in parallel to the discharge line 16 respectively by first and second supply branches 22 and 24. First and second control valves 26 and 28, respectively, are interposed in the branches 22 and 24 for selectively causing pressurizing of the motors 18 and 20 by the pump 10. Both control valves are shown in their neutral positions. The motor 18 may be here taken as representative of a hydraulic motor for powering a steering system on a tractor, and opposite directions of steering are achieved by shifting the control valve 26 in one direction or the other from its neutral position as shown. The motor 20 represents a cylinder which is connected to a rockshaft on the tractor for adjusting implements. Because a motor of this character will be subjected to residual load, it is preferred that the system be equipped with hydraulic check valves such as shown at 30. As will appear, these check valves are instrumental in preventing undesired flow in a feed back circuit to be presently described. The output of the pump 10 is under control of a pump output regulating device 32, here comprising a fluid-receivable chamber 34 in which means such as a piston 36 moves in one direction under action of a biasing means in the form of a spring 38 and in the opposite direction in response to fluid admitted to the chamber 34 in response to the position of a compensating or demand valve means indicated in its entirety at 40. This valve means comprises a piston valve 42 which separates a bore 44 into pressure and pilot chambers 46 and 48 respectively. The pressure chamber 46 is connected via a control line portion 50 to the discharge line 16, and a port 52, controlled by the piston valve 42, is connected via a line 54 to the regulating device chamber 34. Hence, the portions 50 and 54 may be said to constitute a control line under control of the demand valve means 40. The line 54 further leads via an orifice 56 to the reservoir 14. A relief valve 58 is connected across the lines 16 and 54 and dumps excess pressure to the line 54 for ultimate exhaust to the reservoir and at the same time affording an instantaneous pressure rise in the chamber 34 for moving the pump out of stroke or decreasing the pump output. As indicated by the legend, the output of the pump is increased by the spring 38 in the direction of the arrow.

The pilot chamber 48 of the demand valve means 40 is connected to a feed back or pilot circuit 60 which includes first and second branches 62 and 64 that are connected respectively to the first and second supply branches 22 and 24 upstream of the respective control valves 26 and 28. The feed back circuit has an orificed bleed at 66 to reservoir.

Considering the apparatus to the extent described, and assuming that both control valves 26 and 28 are in neutral, the pressure in the discharge line 16 and in the branches 22 and 24 ahead of the control valves 26 and 28 will be determined by the value of a spring 68 at the pilot or feed back side of the demand valve spool or piston 42. Consequently, the port 52 will be open to communicate the control line portions 50 and 54 for supplying fluid to the pump regulating device chamber 34. A small steady flow is supplied, the rate of which is dependent for one thing on the size of the orifice 56. Thus, the pump output is relatively low, being sufficient only to maintain the flow just described at a corresponding pressure which may be considered "standby" pressure. At this time, there will be no flow or pressure in the feed back circuit 60, since any fluid trapped in this circuit can bleed to reservoir at 66. Now, if it is assumed that the control valve 26 is moved out of its neutral position, so as to establish fluid communication to the motor 18, the system will impose a certain demand on the pump 10. This demand will be signaled to the device 32 via the feed back branch 62, which incorporates a pair of one-way valves at 69 for preventing reverse feed back flow from one side or the other of the motor. A similar pair of one-way valves at 70 is provided for the feed back branch 64 for the motor 20.

The resulting pressure rise in the feed back branch 62 will be communicated to the bottom of the demand piston 42 and this pressure, plus that of the spring 68, will cause the valve 42 to close the port 52. Fluid trapped in the line 54 will now be under pressure of the spring 38 and can bleed through the orifice 56, whereupon the output of the pump is increased and the pressure in the discharge line 16 also increases to satisfy the system demand. As soon as the piston in the motor 18 begins to move, the flow through the control valve 26 will incur a pressure drop across the metering port of this valve and the pressure in the feed back branch 62 will drop below that of the pressure in the line 16, with the result that the demand valve spool 42 will uncover the port 52 to add further fluid to the chamber 34 and thus to hold pump output at that signaled by the system demand.

The capacity of the pump 10 is normally sufficient to supply the requirements of both motors 18 and 20 so that if the control valve 28 is opened, in addition to opening the control valve 26, the pump output will be increased via impression of the signal on the demand valve means 40 via the feed back branch 64, which will again change the pressure in the pump regulating device chamber 34. In short, the output of the pump increases as chamber pressure decreases and vice versa. Stated otherwise, pump output increases as the system demand increases and vice versa.

As previously indicated, circumstances may arise in which the system demand approaches or exceeds the capacity of the pump 10. In such circumstances, the natural result is for the supply to go to the motor having the least resistance. However, this may not necessarily be the correct motor at the particular time. In the case of an agricultural tractor equipped with the hydraulic steering motor 18 and the rockshaft motor 20 it is preferred that priority be given to the steering motor 18, for obvious reasons. For this purpose, the system incorporates a priority valve means, indicated in its entirety by the numeral 72. This valve may comprise a housing 74 having a valve bore 76 which carries a valve spool 78 for controlling a pair of opposed ports 80 and 82. These ports are in the supply branch 24 and when opened establish this line in parallel with the branch 22 as respects the pump discharge line 16. One end of the valve spool 78 affords a first piston 84 which is subjected to fluid under pressure from the chamber 34 via a line 86. As will be seen, the connection is here made from the line 86 to the port 52 which, as already described, is connected to the chamber 34 via the line 54. In other words, the fluid-pressure-receivable area of the piston 84 is responsive to chamber pressure at 34. When chamber pressure is at a relatively high value, the spool 78 is shifted to the right against a stop, such as afforded by a snap ring at 88. A relatively light normally unloaded spring 90 is interposed between the end of the spool 78 opposite to the piston 84 and a second piston 92 which operates in an enlargement 94 of the bore 76. This piston has a reduced portion 96 which affords a second piston receivable of fluid from the feed back branch 62 via a line 98. A one-way valve 100 prevents reverse flow in the feed back branch 62 from pressure or flow in the other feed back branch 64. Hence, the piston portion 96 is responsive exclusively to the feed back branch 62 and is not affected by the feed back branch 64.

In the normal or non-operating position of the system, when both control valves 26 and 28 are closed, there will be no pressure in the feed back or pilot circuit 62, and the chamber pressure at 34 in the pump regulating device 32 will be relatively high so that the piston 84 is receivable of this pressure via 54—52—86 and the spool 78 will be to the right so that the ports 80 and 82 in the supply branch are open. Since there is no pressure in the feed back branch 62, there will be no pressure in the priority valve control line 98, and the piston 92—96 will be to the right and there will be substantially no load on the light spring 90 between the spool 78 and the piston 92. During operation of the system, employing both motors, as long as the pump capacity is not approached or exceeded, the pressure in the chamber 34 will be sufficiently high to keep the spool 78 of the priority valve means to the position shown so that both motors receive fluid from the pump. However, as system demand increases, pressure in the chamber 34 decreases, and ultimately this pressure will decrease to a value incurring shifting of the spool 78 to the left to a closed position. This is brought about because of the fact that as demand of the system increases, pressure in the feed back circuit will increase, as will pressure in the priority valve control line 98. As pressure in the line 98 increases, the piston 92—96 is moved to the left, in opposition to pressure on the piston 84 and the spring 90 becomes loaded or primed. Ultimately, the pressure at 98—96 will become so high as to load the spring 90 sufficiently to overcome the decreasing pressure at 84 because of the decreasing pressure at 34. This will be a gradual occurrence and the spool 78 will meter the ports 80 and 82 and will ultimately close these ports and cutout the supply branch 24 so as to assure supply to the motor 18 via the other branch 22.

In the example shown, it may be assumed that a pressure of 50 p.s.i. at 34 will maintain the output of the pump sufficient only to establish the standby pressure, which, as already described, occurs when both control valves 26 and 28 are closed. If it be assumed that the output of the pump is 10 g.p.m., the system will preferably be calibrated so that at an output of 8 g.p.m. the chamber pressure at 34 will be on the order of 10 p.s.i. This situation will be achieved by giving the spring 90 a value of 10 pounds. Such arrangement is preferable because it enables metering of the ports 80—82 as pressure at 34 decreases, which should occur at some point substantially at the maximum capacity of the pump rather than when the capacity is exceeded, primarily because the operational characteristics of the system as a whole will thereby become known to the operator, who can act accordingly. Of course, these variables are representative only and others could be used without departing from the spirit and scope of the invention.

What is claimed is:

1. Hydraulic apparatus, comprising: a variable-displacement pump having a discharge line; a controllable hydraulic system including first and second motors respectively having supply branches connected in parallel to the discharge line and first and second control valves respectively in said branches for selectively incurring separate or joint pressurizing of said motors; priority valve means controlling the second branch and having open and closed positions respectively opening and closing said second branch; a pump output regulating device including means biased in one direction to increase pump output, and means providing a fluid-receivable chamber for receiving fluid to move the biased means in the opposite direction to decrease pump output; feedback means responsive to system demand for decreasing chamber pressure as system demand increases and vice versa so that at relatively high system demand chamber pressure will be relatively low; and means connected between the chamber and the priority valve means for incurring the open position of said priority valve means when chamber pressure is at a predetermined high value and for incurring closing of the priority valve means when chamber pressure decreases to a predetermined low value.

2. The invention defined in claim 1, in which: the priority valve means is constructed to meter fluid through the second supply branch in moving from its open position to its closed position so that as chamber pressure decreases flow through said second branch gradually diminishes.

3. Hydraulic apparatus, comprising: a variable-displacement pump having a discharge line; a controllable hydraulic system including first and second motors respectively having supply branches connected in parallel to the discharge line and first and second control valves respectively in said branches for selectively incurring separate or joint pressurizing of said motors; priority valve means controlling the second branch and having open and closed positions respectively opening and closing said second branch; a pump output regulating device including a fluid receivable chamber and means movable in said chamber for varying pump output according to pressure in said chamber; feedback means responsive to system demand for varying chamber pressure in response to changes in system demand so that pump output increases as demand increases; and means connected between the chamber and the priority valve means for incurring the open position of said priority valve means when chamber pressure reflects system demand within the capacity of the pump to supply both motors and responsive to changes in chamber pressure reflecting system demand at the limit of the pump capacity for incurring the closed position of the priority valve means.

4. Hydraulic apparatus, comprising: a variable-displacement pump having a discharge line; a controllable hydraulic system including first and second motors respectively having supply branches connected in parallel to the discharge line and first and second control valves respectively in said branches for selectively incurring separate or joint pressurizing of said motors; priority valve means controlling the second branch and having open and closed positions respectively opening and closing said second branch; a pump output regulating device; feedback means responsive to increase and decrease in system demand to actuate said device to respectively increase and decrease pump output; and means operative in response to increase of pump output to substantially its maximum capacity to supply both motors for incurring the closed position of the priority valve means.

5. Hydraulic apparatus, comprising: a variable-displacement pump having a discharge line; a controllable hydraulic system including first and second motors respectively having supply branches connected in parallel to the discharge line and first and second control valves respectively in said branches for selectively incurring separate or joint pressurizing of said motors; priority valve means controlling the second branch and having open and closed positions respectively opening and closing said second branch; a pump output regulating device including means biased in one direction to increase pump output, and means providing a fluid-receivable chamber for receiving fluid to move the biased means in the opposite direction to decrease pump output; demand valve means operative to open and close for respectively adding to and cutting off fluid from the chamber via the discharge line; a feedback circuit connected to the demand valve means and having first and second feedback branches connected respectively to the first and second supply branches for openings and closing the demand valve means respectively in accordance with decrease and increase in system demand when the motors are operated so as to respectively increase and decrease chamber pressure; a first piston connected to the priority valve means and receivable of chamber pressure at a relatively high value for incurring the open position of said priority valve means; a normally unloaded spring operative when loaded to act in opposition to chamber pressure on said first piston; a second piston operative to load said spring; and a fluid line connected exclusively to the first feed back branch and acting on the second piston to load said spring when system demand rises so that, when chamber pressure decreases to a relatively low value, said spring will incur the closed position of the priority valve means.

References Cited in the file of this patent
UNITED STATES PATENTS 2,737,196    Eames _____ Mar. 6, 1956
2,799,995    Herman _____ July 23, 1957